United States Patent
Broadbent

(10) Patent No.: US 7,928,905 B2
(45) Date of Patent: Apr. 19, 2011

(54) METHOD OF USING ROAD SIGNS TO AUGMENT GLOBAL POSITIONING SYSTEM (GPS) COORDINATE DATA FOR CALCULATING A CURRENT POSITION OF A PERSONAL NAVIGATION DEVICE

(75) Inventor: Matt Broadbent, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 209 days.

(21) Appl. No.: 12/258,444

(22) Filed: Oct. 26, 2008

(65) Prior Publication Data
US 2010/0103040 A1    Apr. 29, 2010

(51) Int. Cl.
*G01S 19/31* (2010.01)
(52) U.S. Cl. .................................................. 342/357.71
(58) Field of Classification Search ............. 342/357.02, 342/451, 357.71
See application file for complete search history.

(56) References Cited

U.S. PATENT DOCUMENTS

2007/0055441 A1 * 3/2007 Retterath et al. ............... 701/200
2007/0154067 A1 * 7/2007 Laumeyer et al. ............. 382/103

* cited by examiner

*Primary Examiner* — Thomas H Tarcza
*Assistant Examiner* — Harry Liu
(74) *Attorney, Agent, or Firm* — Winston Hsu; Scott Margo

(57) ABSTRACT

A method of using road signs to augment Global Positioning System (GPS) coordinate data for calculating a current position of a personal navigation device includes obtaining recent GPS coordinate data with the personal navigation device, obtaining an image from a camera of the personal navigation device, the image showing areas surrounding a road on which the personal navigation device is traveling, recognizing a sign in the image by performing image processing on the image, and using a known position of the sign to augment the recent GPS coordinate data in order to more precisely determine an actual location of the personal navigation device.

20 Claims, 4 Drawing Sheets

METHOD OF USING ROAD SIGNS TO AUGMENT GLOBAL POSITIONING SYSTEM (GPS) COORDINATE DATA FOR CALCULATING A CURRENT POSITION OF A PERSONAL NAVIGATION DEVICE

BACKGROUND OF THE INVENTION

1. Field of the Invention

The invention relates to a method of utilizing a personal navigation device to perform map matching or dead reckoning, and more particularly, to a method of using known positions of identified road signs to augment GPS coordinate data in order to calculate a more precise location of a personal navigation device.

2. Description of the Prior Art

Global Positioning System (GPS) based personal navigation devices are well known and are widely employed as in-car personal navigation devices. Common functions of a personal navigation device include providing a map database for generating navigation instructions that are then shown on a display of the personal navigation device. These personal navigation devices are often mounted on or in the dashboard of a vehicle using a suction mount or other mounting means.

The term "personal navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Portable GPS personal navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

Dead reckoning is the process of estimating one's current position based upon a previously determined position, and advancing that position based upon known speed, elapsed time, and course. With respect to GPS navigation devices, dead reckoning allows continued navigation in the event of a loss of GPS satellite reception, or when navigating in conditions that make GPS-based positioning unreliable. Loss of GPS satellite reception occurs when driving through areas with no clear view of the sky, such as when in tunnels. GPS receivers also produce erroneous position information when navigating through dense "urban canyons" surrounded by tall buildings, such as in large cities.

In addition to situations in which GPS satellite reception is lost, there may also be times in which the GPS coordinate data are not precise enough to be able to specifically pinpoint which road a vehicle containing the personal navigation device is traveling on. For instance, there might be two nearby parallel roads, and the vehicle containing the personal navigation device is traveling on one of the parallel roads. However, to a large margin of error in the received GPS coordinate data, the personal navigation device cannot definitely determine which of the two parallel roads that the vehicle is traveling on.

In order to overcome the lack of reliable GPS coordinate data in the situations explained above, a method of utilizing other resources for performing map matching or dead reckoning is needed.

SUMMARY OF THE INVENTION

It is therefore one of the primary objectives of the claimed invention to provide a method of using the known positions of road signs for augmenting GPS coordinate data received by a GPS receiver in a personal navigation device.

According to an exemplary embodiment of the claimed invention, a method of using road signs to augment Global Positioning System (GPS) coordinate data for calculating a current position of a personal navigation device is disclosed. The method includes obtaining recent GPS coordinate data with the personal navigation device, obtaining an image from a camera of the personal navigation device, the image showing areas surrounding a road on which the personal navigation device is traveling, recognizing a sign in the image by performing image processing on the image, and using a known position of the sign to augment the recent GPS coordinate data in order to more precisely determine an actual location of the personal navigation device.

According to another exemplary embodiment of the claimed invention, a personal navigation device calculating a current position of the personal navigation device using road signs to augment received Global Positioning System (GPS) coordinate data is also disclosed. The personal navigation device contains a GPS receiver for obtaining recent GPS coordinate data, a camera for obtaining an image showing areas surrounding a road on which the personal navigation device is traveling, and a processor for recognizing a sign in the image by performing image processing on the image, and using a known position of the sign to augment the recent GPS coordinate data in order to more precisely determine an actual location of the personal navigation device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram of a sign located near a road that a vehicle is traveling on.

FIG. 3 is a diagram of a sign located on a grid of roads, where the sign is used to help identify the road that a vehicle is traveling on.

DETAILED DESCRIPTION

Initially, personal navigation devices were only able to rely on Global Positioning System (GPS) coordinate data received from GPS satellites in order to triangulate a current position of the personal navigation device. As the market for personal navigation devices has developed, more features have continually been added to the personal navigation devices. In the present invention, the personal navigation device is equipped with a camera, which allows the personal navigation device to use visual cues for determining the current location of the personal navigation device.

Figure 1:
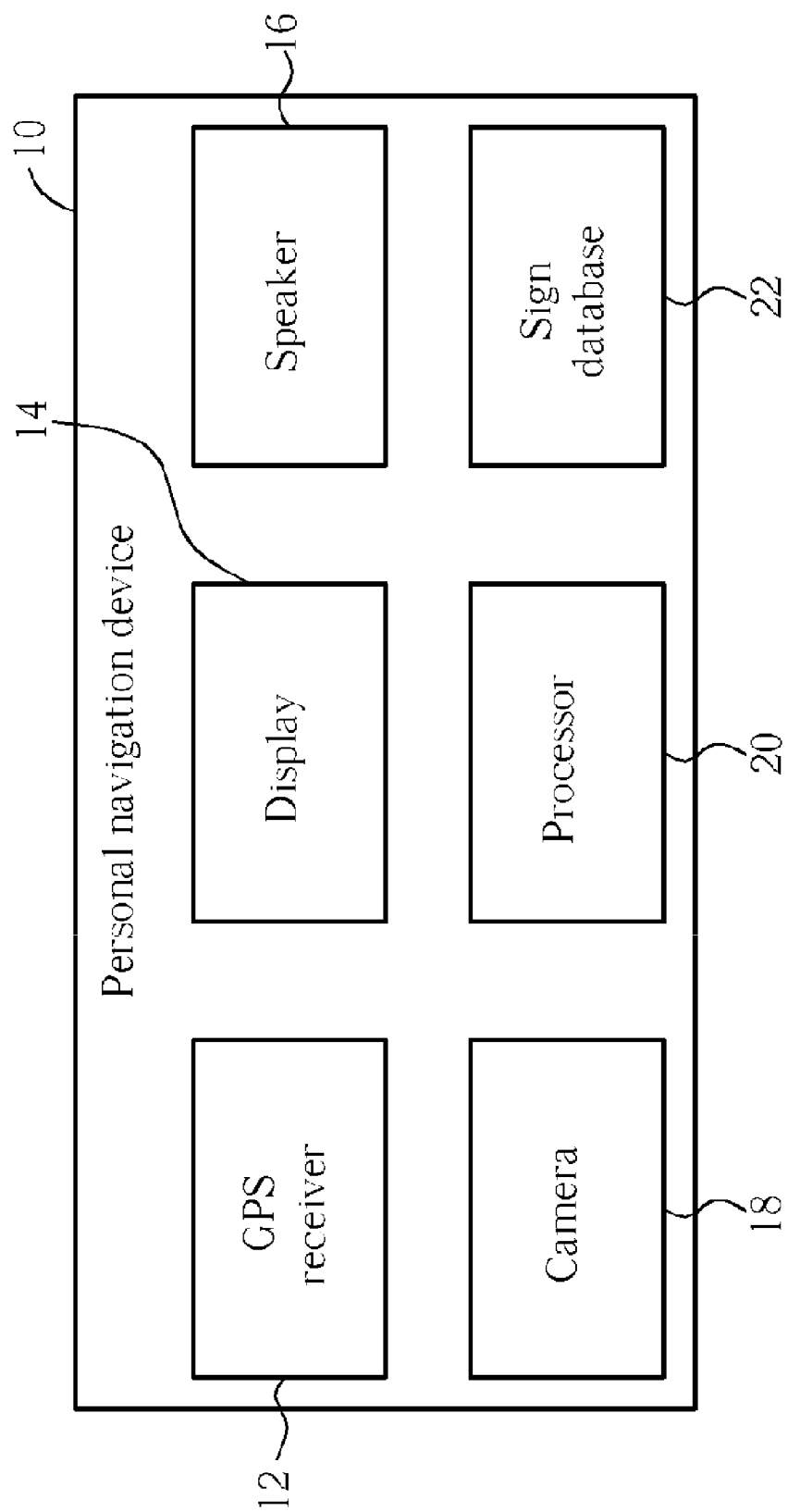
FIG. 1 is a functional block diagram of a personal navigation device according to the present invention.

Please refer to FIG. 1. FIG. 1 is a functional block diagram of a personal navigation device 10 according to the present invention. The personal navigation device 10 contains a GPS receiver 12 for receiving GPS satellite signals and calculating coordinate data that estimates a current position of the personal navigation device 10. The personal navigation device 10 also contains a display 14 and a speaker 16 for providing a user with visual and audio information. The personal navigation device 10 also includes a camera 18, such as a digital still camera or a video camera, for capturing images and determining the presence of road signs in the images. When the personal navigation device 10 is installed in a vehicle, the images are taken of a road and/or areas surrounding the road that the vehicle is traveling on. In this way, the camera 18 is able to capture images of road signs located near the road. A processor 20 is used for controlling operation of the personal navigation device 10 as well as performing image processing on the captured images. The processor 20 can be any suitable form of processor, such as a digital signal processor (DSP) or a central processing unit (CPU), and can be replaced by multiple processors instead of a single processor. The personal navigation device 10 also stores a sign database 22 in a memory of the personal navigation device 10. The sign database 22 stores a list of signs, such as road signs, along with corresponding locations and properties of the signs. The location of each sign can be expressed as a longitude and latitude coordinate pair. The properties of each sign that the sign database 22 stores may include a shape of the sign, a color or colors of the signs, text present on the sign, or arrows present on the sign. Each of these properties, as well as the known location of the sign, can be used by the personal navigation device 10 to identify a sign stored in the sign database 22.

Please note that the camera 18 can be a digital still camera for capturing digital images one at a time or at a predetermined interval, or can also be a video camera for continuously capturing images.

Figure 2:
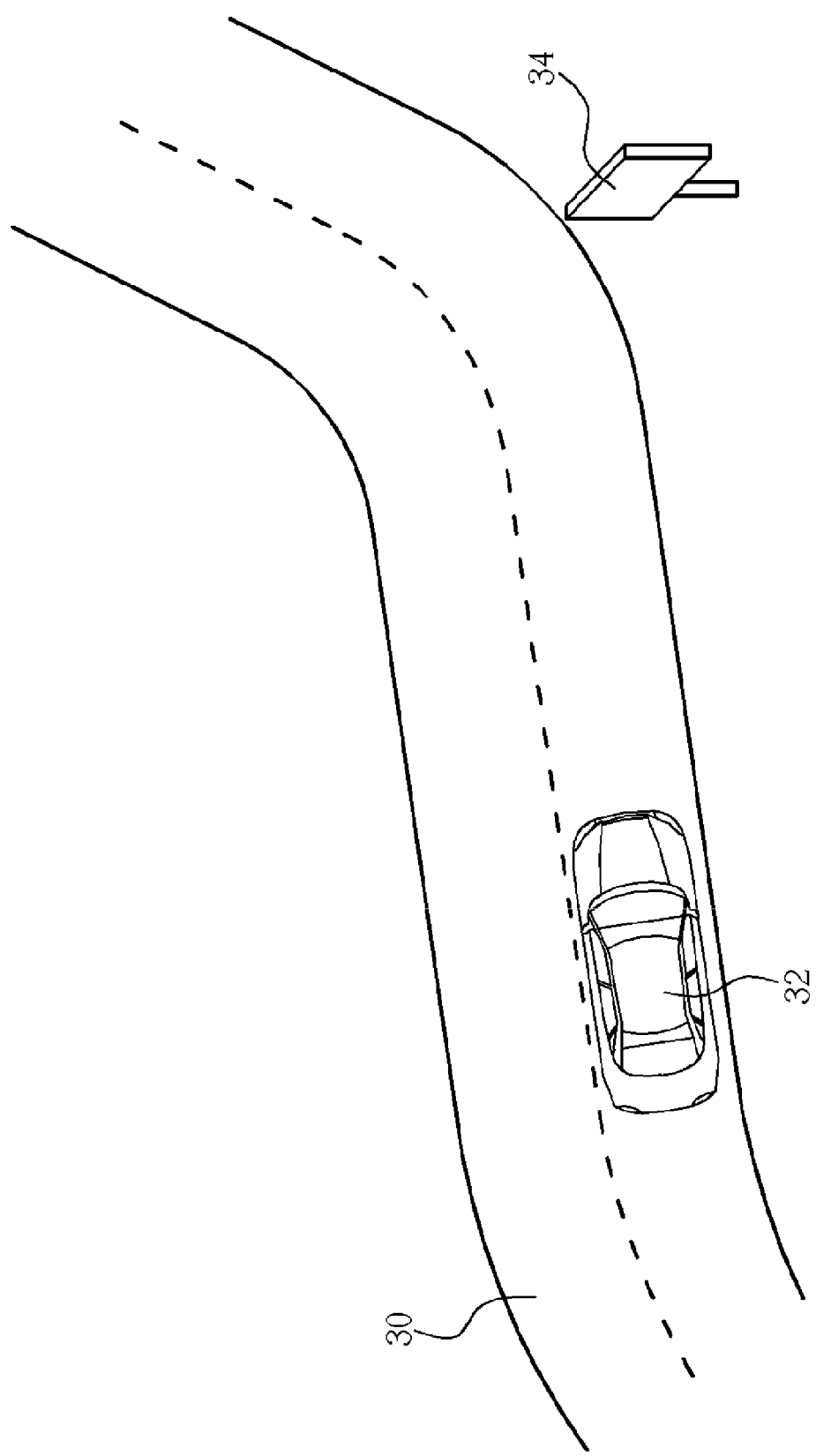

Please refer to FIG. 2. FIG. 2 is a diagram of a sign 34 located near a road 30 that a vehicle 32 is traveling on. The vehicle 32 has the personal navigation device 10 installed in the vehicle 32, such as near the front windshield of the vehicle 32. In this way, the camera 18 of the personal navigation device 10 is able to capture images of the road 30 and the areas surrounding the road 30. Thus, when the vehicle 32 approaches the sign 34, the sign 34 is captured in an image produced by the camera 18. Each time the camera 18 creates an image, the processor 20 performs image processing on the image and uses image recognition techniques for determining if there are any signs present in the image. Returning to FIG. 2, once the processor 20 determines that the sign 34 is present in the image created by the camera 18, the processor 20 compares properties of the sign 34 to signs contained in the sign database 22 for identifying the sign 34. As mentioned above, many different properties of the sign 34 can be used to identify the sign 34. The shape of the sign 34, such as rectangular, triangular, or octagonal shape, can be compared with the shapes of signs in the sign database 22. A color of the sign 34, such as red, green, blue, yellow, white, orange, or a combination of colors can be compared with the colors of signs in the sign database 22. Other markings on the sign 34, such as text or arrows can also be compared with that of signs in the sign database 22.

The sign 34 can also be recognized by comparing the currently calculated position of the personal navigation device 10 to the known positions of signs in the sign database 22. For example, if the road 30 that the vehicle 32 is driving on is a stretch of highway passing through a rural area, there may only be a road sign every kilometer or every few kilometers. When the sign 34 is detected in the image created by the camera 18, the presence of the sign 34 serves as an excellent confirmation of the location of the vehicle 32. If the GPS coordinate data provided by the GPS receiver 12 contained a margin of error of plus or minus 100 meters, identifying the sign 34 helps to pinpoint the exact location of the vehicle 32 by using the known location of the sign 34 stored in the sign database 22.

Another useful feature of the present invention is in performing dead reckoning calculations. Still referring to FIG. 2, suppose that the vehicle 32 is currently driving through a tunnel and the GPS receiver 12 of the personal navigation device 10 is not receiving any GPS satellite signals. In this case, the processor 20 can use recent GPS coordinate data received through the GPS receiver 12 in conjunction with the position information provided by identifying the sign 34 to perform dead reckoning calculations. As an example, assume that the tunnel is 2 kilometers long and that the sign 34 is located halfway through the tunnel. Since the sign 34 is part of the sign database 22, the exact position of the sign 34 can be extracted from the sign database 22. Thus, even though the personal navigation device 10 is not able to receive GPS coordinate data while inside the tunnel, the position of the vehicle 32 is known at the time when the sign 34 is identified.

Figure 3:
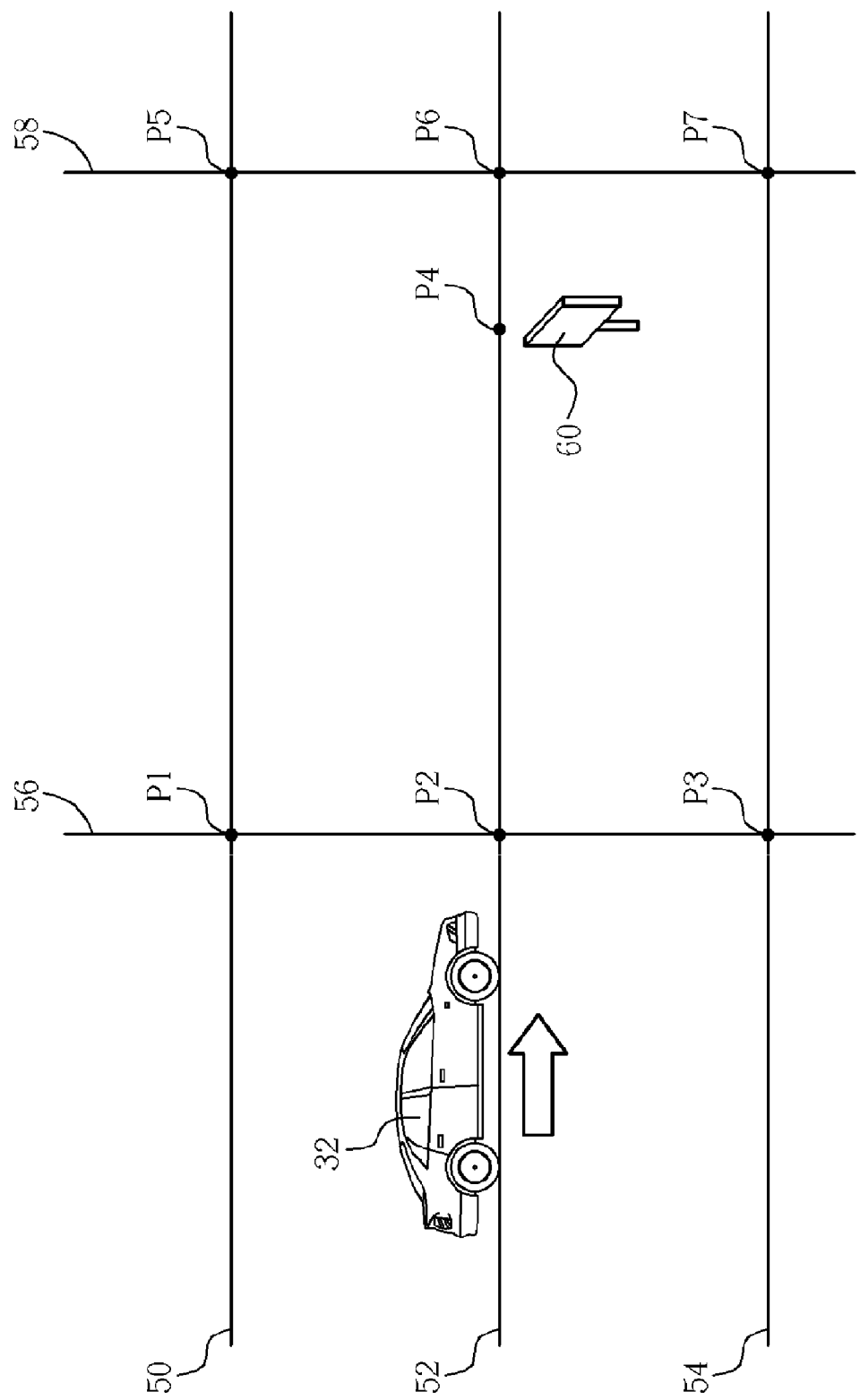

Besides performing dead reckoning calculations, the present invention is also able to help with map matching. The ability to perform map matching allows the personal navigation device 10 to determine its precise location after initially calculating that it is at one of several different locations. Please refer to FIG. 3. FIG. 3 is a diagram of a sign 60 located on a grid of roads, where the sign 60 is used to help identify the road that the vehicle 32 is traveling on. In FIG. 3, roads 50, 52, and 54 extend east-west and are substantially parallel to each other, whereas crossroads 56 and 58 extend north-south. Suppose that the vehicle 32 is traveling east on road 52. Due to imprecise GPS coordinate data, the personal navigation device 10 installed in the vehicle 32 is not able to determine if the vehicle 32 is traveling on road 50, road 52, or road 54 since these roads are parallel to one another and are in close proximity. Thus, when the vehicle 32 approaches the crossroad 56 at point P2, the personal navigation device 10 is not able to determine if the vehicle 32 is at point P1, P2, or P3. Obviously, this can lead to the personal navigation device 10 giving incorrect navigation instructions to a driver of the vehicle 32. Supposing the vehicle 32 continues east on road 52, the vehicle 32 will come across the sign 60 located near point P4. Therefore, once the personal navigation device 10 identifies the sign 60 by capturing the sign 60 in an image and comparing the properties of the sign 60 to signs in the sign database 22, the location of the sign 60 can be known. More importantly, this allows the personal navigation device 10 to learn that the vehicle 32 is traveling on road 52 and not on road 50 or road 54. Then, as the vehicle 32 approaches the crossroad 58 at point P6, the personal navigation device 10 can give proper navigation instructions to the driver. In this way, the identification of the sign 60 allows the personal navigation device 10 to know it is approaching point P6 and not point P5 or point P7.

Figure 4:
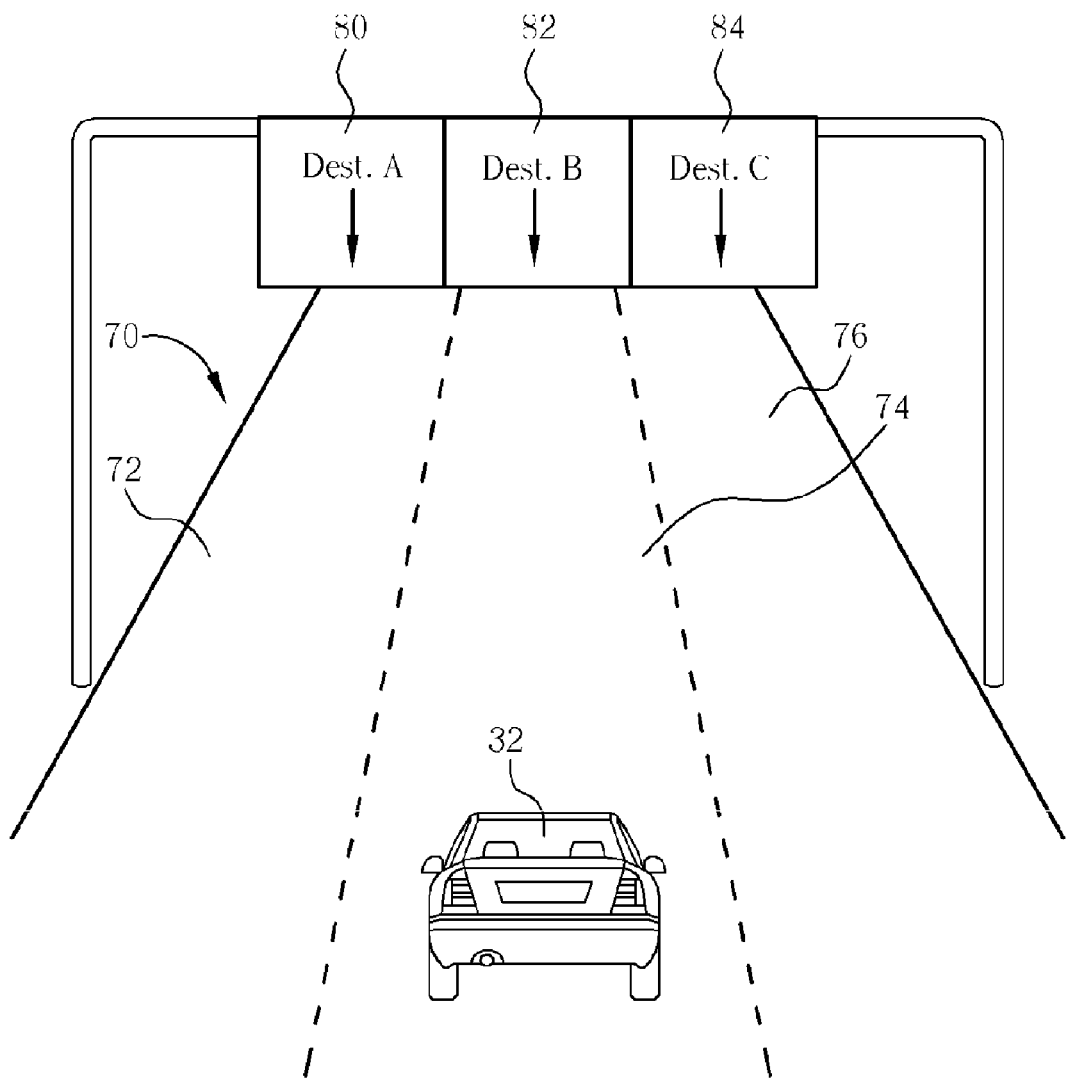
FIG. 4 is a diagram showing signs located above a multi-lane highway.

Please refer to FIG. 4. FIG. 4 is a diagram showing signs 80, 82, and 84 located above a multilane highway 70. When the vehicle 32 approaches the signs 80, 82, and 84 while traveling on the highway 70, not only can the signs 80, 82, and 84 be identified to help the personal navigation device 10 better determine its location on the highway 70, but the signs 80, 82, and 84 can also be used to tell the personal navigation device 10 which lane of the highway 70 that the vehicle 32 is currently driving in. This feature is useful when some of the lanes of the highway 70 split off from the rest of the highway 70, meaning that the vehicle 32 needs to be in the correct lane in order to reach the desired destination without any problems. For example, suppose that lane 72 on the left leads to destination A, lane 74 in the middle leads to destination B, and lane 76 on the right leads to destination C. By capturing an image of the signs 80, 82, and 84 with the camera 18, the personal navigation device 10 can determine which lane of the highway 70 the vehicle 32 is currently driving in by comparing the relative positions of the signs 80, 82, and 84. If the user is traveling to destination A, and is currently in lane 74, the personal navigation device 10 can issue an instruction for the driver to change lanes and move into lane 72. In order for this feature to work best, the position of the personal navigation device 10 will have to be calibrated to ensure that the camera 18 is pointing straight ahead in the vehicle 32.

In summary, the personal navigation device 10 of the present invention uses the camera 18 to obtain images of nearby road signs for augmenting existing GPS coordinate data in order to more precisely determine the current location of the personal navigation device 10. The personal navigation device 10 of the present invention not only uses images of road signs to help determine the actual location of the personal navigation device 10, but can also remind the driver to change lanes to reach the desired destination.

Those skilled in the art will readily observe that numerous modifications and alterations of the device and method may be made while retaining the teachings of the invention.

What is claimed is:

1. A method of using road signs to augment Global Positioning System (GPS) coordinate data for calculating a current position of a personal navigation device, the method comprising:
   obtaining recent GPS coordinate data with the personal navigation device;
   obtaining a real-time image from a camera of the personal navigation device while the personal navigation device is changing its current position, the real-time image showing areas surrounding a road on which the personal navigation device is traveling;
   recognizing a road sign in the real-time image by performing image processing on the real-time image; and
   using a known position of the road sign to augment the recent GPS coordinate data in order to more precisely determine the current position of the personal navigation device.

2. The method of claim 1, wherein the road sign is listed in a sign database, the sign database comprising a list of road signs along with corresponding locations and properties of the road signs.

3. The method of claim 2, wherein the road sign is recognized by comparing a shape of the road sign to shapes of road signs in the sign database.

4. The method of claim 2, wherein the road sign is recognized by comparing a color of the road sign to colors of road signs in the sign database.

5. The method of claim 2, wherein the road sign is recognized by comparing text present on the road sign to text of road signs in the sign database.

6. The method of claim 2, wherein the road sign is recognized by comparing arrows present on the road sign to arrows of road signs in the sign database.

7. The method of claim 2, wherein the road sign is recognized by comparing an approximate location of the personal navigation device as provided by the recent GPS coordinate data to locations of road signs in the sign database.

8. The method of claim 1, wherein the known position of the road sign is used in conjunction with a predicted location of the personal navigation device to determine the current position of the personal navigation device when more than one predicted location is calculated by the personal navigation device.

9. The method of claim 1, wherein the known position of the road sign is used to perform a dead reckoning position calculation when no GPS signals are received by the personal navigation device.

10. The method of claim 1, wherein the camera is a video camera for continuously obtaining real-time images.

11. A personal navigation device calculating a current position of the personal navigation device using road signs to augment received Global Positioning System (GPS) coordinate data, the personal navigation device comprising:
   a GPS receiver for obtaining recent GPS coordinate data;
   a camera for obtaining a real-time image while the personal navigation device is changing its current position, the real-time image showing areas surrounding a road on which the personal navigation device is traveling; and
   a processor for recognizing a road sign in the real-time image by performing image processing on the real-time image, and using a known position of the road sign to augment the recent GPS coordinate data in order to more precisely determine the current position of the personal navigation device.

12. The personal navigation device of claim 11, further comprising a sign database, the sign database comprising a list of road signs along with corresponding locations and properties of the road signs.

13. The personal navigation device of claim 12, wherein the processor recognizes the road sign by comparing a shape of the road sign to shapes of road signs in the sign database.

14. The personal navigation device of claim 12, wherein the processor recognizes the road sign by comparing a color of the road sign to colors of road signs in the sign database.

15. The personal navigation device of claim 12, wherein the processor recognizes the road sign by comparing text present on the road sign to text of road signs in the sign database.

16. The personal navigation device of claim 12, wherein the processor recognizes the road sign by comparing arrows present on the road sign to arrows of road signs in the sign database.

17. The personal navigation device of claim 12, wherein the processor recognizes the road sign by comparing an approximate location of the personal navigation device as provided by the recent GPS coordinate data to locations of road signs in the sign database.

18. The personal navigation device of claim 11, wherein the processor uses the known position of the road sign in conjunction with a predicted location of the personal navigation device to determine the current position of the personal navigation device when more than one predicted location is calculated by the processor using the recent GPS coordinate data.

19. The personal navigation device of claim 11, wherein the processor uses the known position of the road sign to perform a dead reckoning position calculation when the GPS receiver receives no GPS signals.

20. The personal navigation device of claim 11, wherein the camera is a video camera for continuously obtaining real-time images.

* * * * *